Nov. 9, 1965   J. KRICKSFELD ETAL   3,216,142
SIGNALLING DEVICE FOR INDICATING A FISH STRIKE
Filed Oct. 8, 1964                                2 Sheets-Sheet 1

INVENTOR.
JULIUS KRICKSFELD
SOL WASSERMAN
BY
ATTORNEY

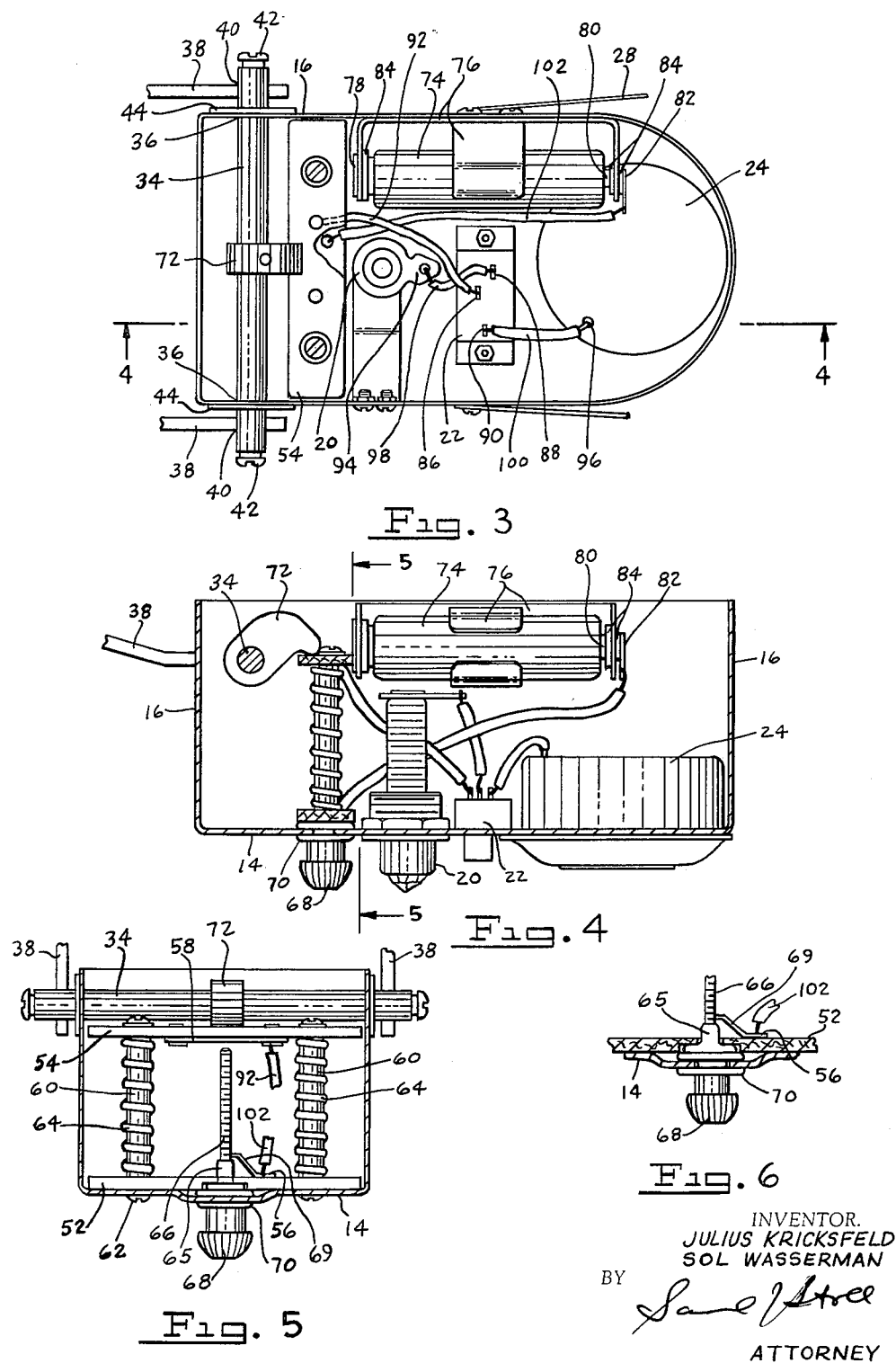

3,216,142
SIGNALLING DEVICE FOR INDICATING
A FISH STRIKE
Julius Kricksfeld, 2947 W. 25th St., and Sol Wasserman,
2829 W. 27th St., both of Brooklyn, N.Y.
Filed Oct. 8, 1964, Ser. No. 402,598
8 Claims. (Cl. 43—17)

The present invention relates to a signalling device for indicating the presence of a fish on a line, and is a continuation-in-part of our copending patent application, Serial No. 361,373, filed April 21, 1964, and entiled Fish Strike Signalling Device.

It is an object of the present invention to provide a compact, reliable signalling device which will indicate the presence of a fish strike on a fishing line.

It is another object of the present invention to provide a signalling device for indicating the presence of a fish strike which can be secured to a spike or other fishing rod supporting means.

It is yet another object of the present invention to provide a signalling device for indicating the presence of a fish strike, which is adjustable to compensate for environmental factors such as wind, tide, currents and the like, whereby the signalling device will be activated only when there is an actual fish strike.

It is a further object of the present invention to provide a signalling device which emits an audible signal, a visible signal, or both.

It is yet a further object of the present invention to provide a signalling device which, when not in use, is compact and may be easily stored in a tackle bag or the like.

These and other objects, features and advantages of the present invention will become more apparent when considered in conjunction with the accompanying drawings, wherein:

FIGURE 3 is a rear view of the signalling device depicted by FIGURE 1 with the rear cover thereof removed.

FIGURE 4 is a sectional view taken on the line 4—4 of FIGURE 3.

FIGURE 5 is a sectional view taken on the line 5—5 of FIGURE 4.

FIGURE 6 is a partial sectional view of a portion of FIGURE 5.

Figures 1, 2:
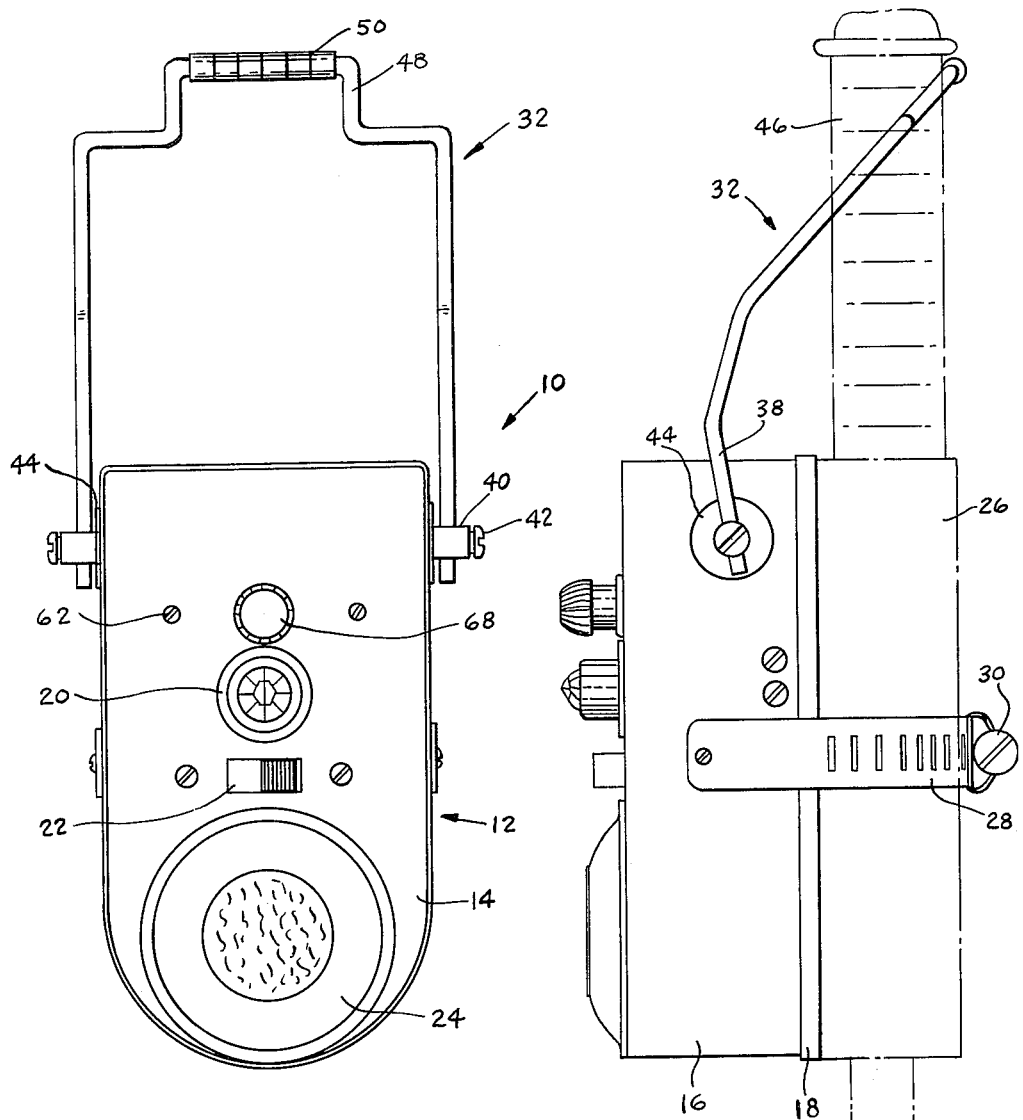
FIGURE 1 is a top view of the signalling device of the present invention.
FIGURE 2 is a side view of the signalling device of FIGURE 1, secured to a spike having a fishing rod therein.

Referring now to the drawings, FIGURE 1 depicts the signalling device 10 which includes a casing 12, having a top portion 14, side walls 16 and a back cover plate 18; said cover plate being detachably secured to said casing. The casing in the present invention is made of metal, but may also be made of plastic or any other suitable material. Disposed within said casing and mounted on the top portion 14 thereof are a light assembly 20, a switch 22 and a horn 24.

The signalling device 10 is secured to a tubular sand spike 26 by means of an adjustable clamp 28 connected to the side walls 16 of said casing, and a worm gear 30. The worm gear 30 is attached to the clamp 28 and serves to tighten the clamp around said tubular sand spike, thereby securing said signalling device with respect thereto.

A substantially U-shaped member 32 is secured to a shaft 34, which is journalled in openings 36 in the side walls 16 of said casing, by means of its end portions 38 which project into holes 40 in the ends of said shaft. The ends of the shaft are internally threaded to receive screws 42 in threaded engagement therewith, thereby adjustably securing the end portions 38 of said U-shaped member within the holes 40. Washers 44 are interposed between the side walls 16 and the end portions 38 to prevent longitudinal movement of said shaft.

After the casing 12 has been secured to the spike 26, as previously described, the U-shaped member 32 is pivoted rearwardly to its operative position (as seen in FIGURE 2); said member being pivotable about the longitudinal axis of the shaft 34. The handle 46 of a fishing pole is then inserted into said tubular spike. The top of said U-shaped member has a convex portion 48 upon which are mounted a plurality of rollers 50, which facilitate the insertion and withdrawal of said handle into and out of said spike, and upon which the handle 46 rests.

Disposed within said casing 12 and positioned adjacent the shaft 34 are an insulating lower plate or bar 52 and an insulating upper plate or bar 54, said lower bar 52 having a terminal strip 56 centrally located on the top thereof and said upper bar 54 having a terminal strip 58 centrally located on the underside thereof. The bars 52 and 54 each have a pair of openings into which internally threaded hollow shank fasteners 60 are inserted to axially align said bars, as best seen in FIGURE 5. The axially aligned bars are positionally secured with respect to the casing 12 by screws 62, which pass through the top 14 of said casing and are threadily engaged by the fasteners 60; said bars being spaced from one another by coil springs 64 placed over the shank of said fasteners 60. The bar 52 has an internally threaded collar 65 centrally located thereon which threadily engages an adjusting screw 66 having a plastic cap 68; said cap being positioned on the outside of the casing 12, as seen in FIGURES 1, 5 and 6. The terminal strip 56 has a flange member 69 (as seen in FIGURES 5 and 6) which connects said terminal strip to the adjusting screw 66, and a rubber grommet 70 is interposed between the underside of the bar 52 and the top portion 14 of the casing 12 to electrically insulate said threaded collar and said screw from said casing.

A cam 72, secured to the center of the shaft 34, is adapted to engage the upper bar 54 in a manner which will be explained in detail hereinafter.

A penlight battery 74 is mounted on one of the side walls 16 by means of a mounting bracket 76, which bracket connects the negative terminal 78 of said battery to the casing 12, thereby grounding said terminal. The positive terminal 80 of said battery is connected to a terminal strip 82; both said positive terminal and said terminal strip being insulated from said mounting bracket 76 by insulating washers 84, as seen in FIGURES 3 and 4.

The switch 22 has three terminals, 86, 88 and 90. The terminal 86 is connected by means of an insulated wire 92 to the terminal strip 58. The terminal 94 of the light assembly 20 is connected to the terminal 88 and the terminal 96 of the horn 24 is connected to the terminal 90 by means of electrically insulated wires 98 and 100, respectively. Another electrically insulated wire 102 connects the terminal strip 82 to the terminal strip 56. The light assembly 20 and the horn 24 are also connected to the casing 12, thereby supplying said light assembly and said horn with a ground connection which completes the circuit from the battery to said light assembly and said horn, when they are activated.

In the operation of the signalling device, when a fish strikes, the handle 46 (as seen in FIGURE 2) causes the U-shaped member 32 to pivot rearwardly, thereby causing rotational movement of the shaft 34, whereby the cam 72, which normally rests on the bar 54, depresses the bar. When the bar 54 is depressed, the terminal strip 58 contacts the lead end of the threaded screw 66, activating the signal device 10. It is to be noted that the positive terminal 80 of the battery 74 is connected to the terminal 56, so that when the screw 66 contacts the terminal 58 the positive terminal is connected through said screw to the terminal 58 and thence to terminal 86 of the switch 22. The switch 22 can be moved to one of three positions whereby either the horn, the light or both will be energized when said signalling device is activated. Therefore, when the lead end of the threaded screw 66 (as shown in FIGURE 5) comes in contact with the terminal strip 58, as hereinbefore discussed, the signalling device will indicate the presence of a fish strike by emitting either a visual signal, an audible signal, or both an audible and a visual signal. Since the threaded screw 66 can be adjusted to vary the distance between it and the terminal strip 58, the signalling device can be made to compensate for currents, tides and winds, whereby the aforementioned environmental factors cannot activate said device to emit false signals. This is accomplished by tightening the screw 66 until it contacts the terminal strip 58 and activates either the light or the horn. The screw is then loosened until the light or horn is deactivated. It is thus seen that if the signalling device is thereafter activated, it will be solely due to a fish strike.

It should be noted that if the casing 12 is made of a non-conducting material such as plastic, additional leads will be required to connect the negative battery terminal 78 to the switch 22, light assembly 20 and horn 24 in order to complete the electrical circuit thereto.

It is therefore seen that the present invention provides a signalling device which emits an audible, visible, or both types of signals for indicating the presence of a fish strike and is adjustable to compensate for environmental factors which would normally tend to render the device ineffectual.

While I have shown and described the preferred embodiment of my invention, there are many modifications which may be made therein without departing from the spirit and scope of the invention as defined by the appended claims.

What is claimed is:

1. A signalling device for use in conjunction with a fishing rod for indicating the presence of a fish strike and adapted to be secured to a spike or other fishing rod supporting means, said device comprising a housing, an electrical energy source carried within said housing, signal means, a shaft rotatably mounted within said housing, a movable member having one end thereof in abutting relationship with the handle of said fishing rod and the other end thereof connected to said shaft, a pair of axially aligned plates positionally secured within said housing and spaced from one another by spring means interposed therebetween, actuating means connected to said plates, said actuation means, electrical energy source and signal means being connected in circuit with one another, said actuating means being adapted to connect said electrical energy source across said signal means to cause actuation thereof when one of said plates is moved towards the other of said plates, a cam, and means for connecting said cam to said shaft, said cam being positioned in an abutting relationship with said one of said plates, whereby a fish strike causes movement of said handle and said movable member concomitantly therewith, causing rotational movement of said shaft and causing said cam to move said one of said plates towards the other of said plates, thereby causing said actuating means to connect the electrical energy source across said signal means to activate the same.

2. A signalling device for use in conjunction with a fishing rod indicating the presence of a fish strike in accordance with claim 1, wherein said signal means comprises an audible signal and a visual signal.

3. A signalling device for use in conjunction with a fishing rod indicating the presence of a fish strike in accordance with claim 2, including selective switch means connected to said actuating means to selectively actuate said audible signal, said visual signal, or both of said signals simultaneously.

4. A signalling device for use in conjunction with a fishing rod indicating the presence of a fish strike in accordance with claim 1, wherein said actuation means includes adjustment means to compensate for variations in environmental conditions.

5. A signalling device for use in conjunction with a fishing rod indicating the presence of a fish strike in accordance with claim 3, wherein said actuation means includes adjustment means to compensate for variations in environmental conditions.

6. A signalling device for use in conjunction with a fishing rod indicating the presence of a fish strike in accordance with claim 1, wherein said movable member has a substantially U-shaped configuration and is adjustably secured to said shaft.

7. A signalling device for use in conjunction with a fishing rod indicating the presence of a fish strike in accordance with claim 6, wherein said U-shaped member has a convex top portion upon which are mounted a plurality of rollers to facilitate the insertion and withdrawal of said fishing rod handle into and out of said spike.

8. A signalling device for use in conjunction with a fishing rod for indicating the presence of a fish strike in accordance with claim 1, wherein said actuation means comprises a terminal strip secured to said one of said plates and an electrically conductive screw connected to said other of said plates, said electrical energy source having two terminals, one of which is connected to said terminal strip and the other of which is connected to said screw, whereby when said screw contacts said terminal strip the potential of the electrical energy source is impressed across said signal means to activate the same.

No references cited.

ABRAHAM G. STONE, *Primary Examiner.*
SAMUEL KOREN, *Examiner.*